US012129628B2

(12) United States Patent
Jadhav et al.

(10) Patent No.: US 12,129,628 B2
(45) Date of Patent: Oct. 29, 2024

(54) CONTROL ARCHITECTURE FOR PRIME MOVER STALL PREVENTION

(71) Applicant: Danfoss A/S, Nordborg (DK)

(72) Inventors: Mahesh K Jadhav, Pune (IN); Kedar Rugge, Pune (IN)

(73) Assignee: DANFOSS A/S, Nordborg (DK)

( * ) Notice: Subject to any disclaimer, the term of this patent is extended or adjusted under 35 U.S.C. 154(b) by 0 days.

(21) Appl. No.: 17/997,320

(22) PCT Filed: Apr. 30, 2021

(86) PCT No.: PCT/EP2021/025167
§ 371 (c)(1),
(2) Date: Oct. 27, 2022

(87) PCT Pub. No.: WO2021/219253
PCT Pub. Date: Nov. 4, 2021

(65) Prior Publication Data

US 2023/0167629 A1 Jun. 1, 2023

(30) Foreign Application Priority Data

May 1, 2020 (IN) ............................. 202011018679

(51) Int. Cl.
*E02F 9/22* (2006.01)
*F15B 11/16* (2006.01)
*F15B 21/08* (2006.01)

(52) U.S. Cl.
CPC .......... *E02F 9/2221* (2013.01); *E02F 9/2228* (2013.01); *E02F 9/2235* (2013.01);
(Continued)

(58) Field of Classification Search
CPC ..... F15B 11/161; F15B 11/165; F15B 11/166; E02F 9/2246; E02F 9/226; E02F 9/2221
See application file for complete search history.

(56) References Cited

U.S. PATENT DOCUMENTS 3,020,697 A 2/1962 Sherman
5,630,317 A * 5/1997 Takamura ............ E02F 9/2228 60/449

(Continued)

OTHER PUBLICATIONS

Hearing Notice for Indian Patent Application No. 202114045292, dated Dec. 20, 2023.

(Continued)

*Primary Examiner* — Michael Leslie
(74) *Attorney, Agent, or Firm* — McCormick, Paulding & Huber PLLC

(57) ABSTRACT

A method for preventing prime mover stall for a work machine including a hydraulic system having a plurality of control valves served by a hydraulic pump. The method can include determining an actual required flow rate value for the plurality control valves and a total maximum flow rate to the plurality of control valves that will enable the prime mover to operate without stalling. The method can also include operating the plurality of control valves such that the combined total flow of the plurality control valves is at or below the total maximum flow rate such that the pump operates at a condition below which prime mover stall will occur. The method can also include setting a flow sharing allocated specific criteria in which the flow reduction takes place during a flow saturation condition for each of the plurality of control valves such that the total sum of the flow rates (calculated based on the criteria) is equal to or less than the total maximum flow rate.

12 Claims, 9 Drawing Sheets

(52) U.S. Cl.
CPC ............ *E02F 9/226* (2013.01); *F15B 11/161* (2013.01); *F15B 11/163* (2013.01); *F15B 11/165* (2013.01); *F15B 21/087* (2013.01); *E02F 9/2246* (2013.01); *F15B 2211/20546* (2013.01); *F15B 2211/6651* (2013.01); *F15B 2211/6652* (2013.01); *F15B 2211/6654* (2013.01)

(56) References Cited

U.S. PATENT DOCUMENTS

| | | | | |
|---|---|---|---|---|
| 8,483,916 | B2 * | 7/2013 | Peterson ............... | E02F 9/2228 701/50 |
| 10,407,875 | B2 * | 9/2019 | Kawaguchi ......... | F15B 11/0423 |
| 10,947,702 | B2 * | 3/2021 | Takahashi ............. | F15B 11/165 |
| 11,454,003 | B2 * | 9/2022 | Caldwell ............... | E02F 9/2235 |
| 2007/0119159 | A1 | 5/2007 | Egelja et al. | |
| 2010/0154403 | A1 | 6/2010 | Brickner et al. | |
| 2012/0221212 | A1 | 8/2012 | Peterson et al. | |

OTHER PUBLICATIONS

International Search Report mailed on Nov. 3, 2021, in connection with corresponding International Application No. PCT/EP2021/025167; 6 pages.

* cited by examiner

CONTROL ARCHITECTURE FOR PRIME MOVER STALL PREVENTION

CROSS-REFERENCE TO RELATED APPLICATION

This application is a National Stage application of International Patent Application No. PCT/EP2021/025167, filed on Apr. 30, 2021, which claims priority to Indian Provisional Patent Application No. 202011018679, filed on May 1, 2020, each of which is hereby incorporated by reference in its entirety.

BACKGROUND

Hydraulic systems are commonly used to power various functions of work machines, such as the propulsion of the work machine and various work circuits. For example, a hydraulic system in an excavator application could be configured to power one or more hydraulic actuators to drive the work machine and to power boom, arm, bucket, swing and travel functions. In some circumstances, the combined power required to simultaneously service all of the power requirements of the work machine can be enough to stall the prime mover powering the hydraulic system. In some implementations, prime mover stall is controlled by utilizing a mechanical torque controller directly mounted on the pump. In some implementations, the torque controller is controlled through software by monitoring the prime mover speed drop, wherein the rate of change in prime mover speed is used to control flow from the pump through a separate control valve to prevent prime mover stall. In some cases, electronic displacement control pump is used to prevent prime mover stall. Although these approaches operate to prevent prime mover stall, additional costs are incurred, and additional components are required with respect to pump torque control, an electronic displacement control, etc.

SUMMARY

In general terms, the present disclosure is directed to improved control approach for preventing prime mover stall for a work machine without requiring the incorporation of additional control equipment. Such work machines include, for example, an excavator, wheel loader, backhoe loader, tractor, telehandler, etc. In examples, the prime mover can be an internal combustion engine. In examples, the prime mover can be an electric motor.

From the prime mover speed-torque/power curve a flow vs pressure map is generated for different prime mover speed and fed to the supervisory controller or alternatively the control system in the supervisory controller itself can generate the flow vs pressure map utilizing the prime mover speed-torque/power curve which is provided as an input. The actual set prime mover speed is communicated to the supervisory controller along with the pump inlet pressure. Based on these 2 inputs the control system determines the max flow that can be generated w/o stalling the prime mover at that particular prime mover speed and pump pressure from the map. This is referenced to 'max available flow'. The control system also estimates the 'total pump flow' required based on the joysticks input command. The flow sharing control block compares the 'total required flow' with the 'max available flow' and when the 'total required flow' is greater than 'max available flow' the block commands reduced flow demand based on the priority setting to different control valve spools to meet the max available flow. Based on the reduced flow demand the spool openings are reduced and the load sense pump accordingly de-strokes to maintain the LS margin thereby reducing the pump output flow and prevent the prime mover from stalling. The flow sharing block can reside in the supervisory controller or in the control valve controller like Eaton CMA twin spool control valve.

A method for preventing prime mover stall for a work machine including a hydraulic system having a plurality of control valves served by a hydraulic pump is disclosed. The method can include determining, at a controller, an actual required flow rate value for the plurality control valves; determining, at the controller, a total maximum flow rate to the plurality of control valves that will enable the prime mover to operate without stalling; and operating the plurality of control valves, with the controller, such that the combined total flow of the plurality control valves is at or below the total maximum flow rate such that the pump operates at a condition that is below a condition at which prime mover stall would occur.

In some examples, the method includes setting, at the controller, a maximum flow or setting for each of the plurality of control valves based on flow sharing criteria such that a total sum of control valve flow rates is equal to or less than the total maximum flow rate and operating each of the plurality of control valves, with the controller, at or below the total maximum flow rate based on the flow sharing criteria associated with each control valve.

In some examples, the determining step includes referencing a first map correlating prime mover speed with prime mover torque.

In some examples, the determining step includes generating a second map correlating pump flow with pressure at one or more prime mover speeds based on the first map.

In some examples, the determining step includes returning a pump flow value from the second map based on a sensed hydraulic system pressure and an actual prime mover speed.

In some examples, the determining step further includes using a joystick input to determine the pump flow value.

In some examples, the pump is operated without a torque limiter.

A method for preventing prime mover stall for a work machine hydraulic system can include the steps of: receiving at a control system, a prime mover speed requirement and a hydraulic system inlet pressure value associated with one or more control valves of the hydraulic circuit; calculating, at the control system, an actual required flow rate value of the hydraulic circuit; referencing a map, with the control system, using the prime mover speed setting the actual required flow rate, and the inlet pressure value to return a maximum flow rate setting; and operating the one or more control valves, with the control system, such that the lesser of the actual required flow rate and the maximum flow rate setting is not exceeded; and controlling a pump of the hydraulic system with a load-sense control to de-stroke the pump to meet the maximum flow rate setting to prevent stalling of the prime mover.

In some examples, the map includes multiple curves of flow vs pressure for different prime mover speed settings generated from the prime mover curve In some examples, the map is generated by the control system from a prime mover curve map.

In some examples, the map includes flow vs pressure curves based on the different modes of operation that are provided on the machine-like standard, economy and power mode.

In some examples, the step of operating the one or more control valves includes reducing the opening area of the one or more valves such that the lesser of the actual required flow rate and the maximum flow rate setting is not exceeded to prevent stalling of the prime mover.

In some examples, the method further includes the step of defining a maximum flow demand setting by selecting the lower of the actual required flow rate and the maximum flow rate setting, wherein the step of operating the one or more control valves includes operating the one or more valves to not exceed the maximum flow demand setting.

In some examples, the pump is operated without a torque limiter.

In one example, a method for preventing prime mover stall for a work machine including a hydraulic system includes the steps of receiving, at a control system, a prime mover speed requirement and a hydraulic system inlet pressure value associated with one or more control valves of the hydraulic circuit; calculating, at the control system, an actual required flow rate value of the hydraulic circuit; referencing a map, with the control system, using the prime mover speed setting the actual required flow rate, and the inlet pressure value to return a maximum flow rate setting; and continuously or repeatedly monitoring an actual prime mover speed and inlet pressure and updating the maximum flow rate setting based on the actual prime mover speed and the inlet pressure; operating the one or more control valves, with the control system, such that the lesser of the actual required flow rate and the maximum flow rate setting is not exceeded; and controlling a pump of the hydraulic system with a load-sense control to de-stroke the pump to meet the maximum flow rate setting to prevent stalling of the prime mover.

In some examples, the map includes multiple curves for different prime mover speed settings.

In some examples, the map is generated by the control system from a prime move curve map.

In some examples, the map includes curves for a power mode operational setting of the prime mover and for an economy mode operational setting of the prime mover.

In some examples, the step of operating the one or more control valves includes reducing the opening area of the one or more valves such that the lesser of the actual required flow rate and the maximum flow rate setting is not exceeded to prevent stalling of the prime mover In some examples, the method further includes the step of defining a maximum flow demand setting by selecting the lower of the actual required flow rate and the maximum flow rate setting, wherein the step of operating the one or more control valves includes operating the one or more valves to not exceed the maximum flow demand setting.

In some examples, the pump is operated without a torque limiter.

In one example, a method for preventing prime mover stall for a work machine including a hydraulic system includes receiving, at a control system, a hydraulic system inlet pressure value associated with one or more control valves of the hydraulic circuit;

calculating, at the control system, an actual required flow rate value of the hydraulic circuit; referencing a map, with the control system, using the actual required flow rate and the inlet pressure value to return a target prime mover speed; and controlling a speed of the prime mover to meet the target prime mover speed.

In some examples, the map is generated by the control system from a prime mover curve map.

In some examples, the map includes curves for a power mode operational setting of the prime mover and for an economy mode operational setting of the prime mover.

In some examples, the pump is operated without a torque limiter.

A method for preventing prime mover stall for a work machine including a hydraulic system having a plurality of control valves served by a hydraulic pump can include setting a total maximum flow rate to the plurality of control valves; monitoring an actual speed of the prime mover; detecting an actual drop in speed of the prime mover; comparing the actual drop in speed with a parameter value; and where the actual drop in speed exceeds the parameter value, reducing the total maximum flow rate to prevent prime mover stall.

In some examples, the method includes setting, at the controller, a maximum flow or setting for each of the plurality of control valves based on flow sharing criteria such that a total sum of control valve flow rates is equal to or less than the total maximum flow rate and operating each of the plurality of control valves, with the controller, at or below the total maximum flow rate based on the flow sharing criteria associated with each control valve.

DETAILED DESCRIPTION

Various embodiments will be described in detail with reference to the figure. Reference to various embodiments does not limit the scope of the claims attached hereto. Additionally, any examples set forth in this specification are not intended to be limiting and merely set forth some of the many possible embodiments for the appended claims.

Figure 1:
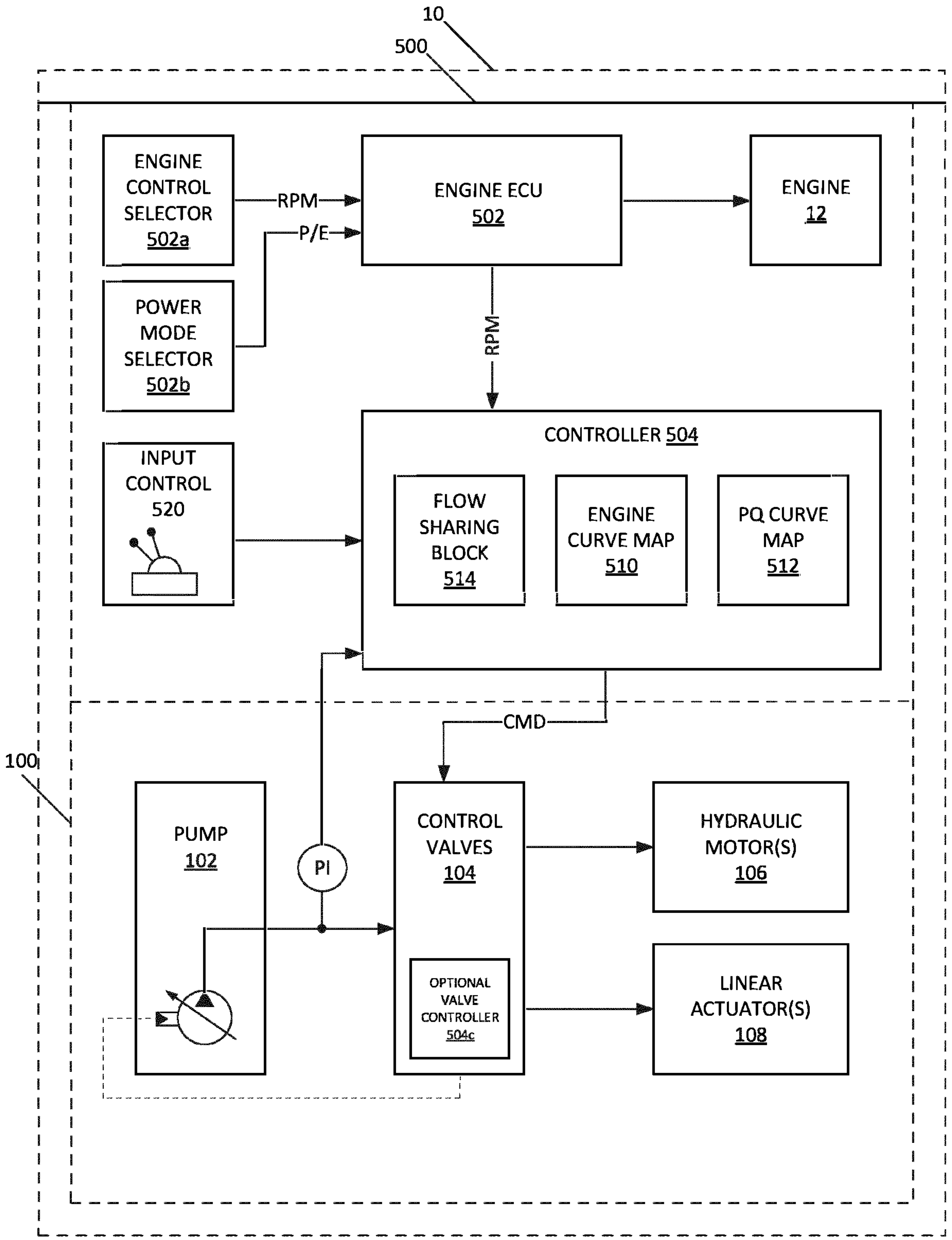
FIG. 1 is a schematic illustration of a work machine having a hydraulic system and control system having features in accordance with the present disclosure.

Referring to FIG. 1, a work machine 10, hydraulic system 100, and control system 500 are schematically shown. One non-limiting example of a work machine 10 is a excavator. Many other examples exist. In one aspect, the hydraulic system 100 of the work machine 10 can include a hydraulic pump 102 for powering one or more actuators. For example, the hydraulic pump can power one or more hydraulic motors 106 and one or more linear actuators 108 of the work machine. In some examples, such as with excavator, hydraulic motors 106 are provided as part of a propulsion circuit for the work machine 10 and to rotate the upper carriage of work machine 10, the linear actuators 108 are provided as part of one or more work circuits and utilized to perform various functions, such as boom-raise/lower, arm-in/out, bucket tilt-in/tilt-out. The number of work circuits and actuators is generally dependent upon the type and function of the work machine 10. Other configurations are possible.

Control System

With continued reference to FIG. 1, the work machine 10 may also include a control system 500 for controlling the functions of the work machine 10.

The control system 500 can include a processor and a non-transient storage medium or memory, such as RAM, flash drive or a hard drive. Memory is for storing executable code, the operating parameters, and the input from the operator user interface while processor is for executing the code. The control system 500 can also include transmitting/receiving ports, such as a CAN bus connection or an Ethernet port for two-way communication with a WAN/LAN related to an automation system and to interrelated controllers. A user interface may be provided to activate and deactivate the system, allow a user to manipulate certain settings or inputs to the control system 500, and to view information about the system operation.

The control system 500 typically includes at least some form of memory. Examples of memory include computer readable media. Computer readable media includes any available media that can be accessed by the processor. By way of example, computer readable media include computer readable storage media and computer readable communication media. Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the processor.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

In one aspect, the control system 500 can include a prime mover electronic control unit (ECU) 502 which controls the functions of the work machine prime mover 12 and also receives inputs from the operator. For example, the ECU 502 can receive inputs from a prime mover control selector 502*a* which commands the work machine prime mover 12 to operate at a specified rotational speed (RPM). The ECU 502 can also receive a power mode selector input 502*b* which provides a selection between, for example, an economy mode in which prime mover output is limited and a power mode in which prime mover output is not limited. In one aspect, the ECU 502 communicates over a controller area network (CAN bus).

In another aspect, the control system 500 can include a controller 504 for controlling the hydraulic functions of the work machine 10. The controller 504 can receive various inputs and provide various outputs. For example, the controller 504 can receive signals from pressure sensors PI (e.g. independent sensor or integrated into valve assembly/valve controller), input controllers such as joysticks 520, and external prime mover speed sensor (in case prime mover speed to not available over CAN). For example, the controller 504 can send outputs to control valves 104 which control the hydraulic actuators (e.g. motors 106, linear actuators 108), and can communicate with the ECU 502 over the CAN or via another network or system. In one aspect, the controller 504 can include a flow sharing block 514 in which flow priority to the control valves 104 is established such a proportion of the total flow available from the pump is allocated to each individual valve. In some examples, the flow sharing control block compares the 'total required flow' based on current demand with the 'max available flow' at the pump and, when the 'total required flow' is greater than 'max available flow', the flow sharing block 514 commands reduced flow demand based on the priority setting or criteria to different control valve spools to meet the max available flow. Specific criteria can be used by the system to determine the specific manner in which the flow reduction should take place during a flow saturation condition in which the total flow demand exceeds the maximum available flow. For example, specific criteria can be used to define a cascade approach where flows are reduced to lower priority valves based on a priority setting or a ratio approach in which criteria are used to reduce flow across the valves in the same ratio. Other approaches are also possible. Using such flow sharing approaches, the individual valves are commanded to collectively consume no more flow than the maximum available flow while ensuring that each valve is assigned an appropriate available flow.

Figure 3:
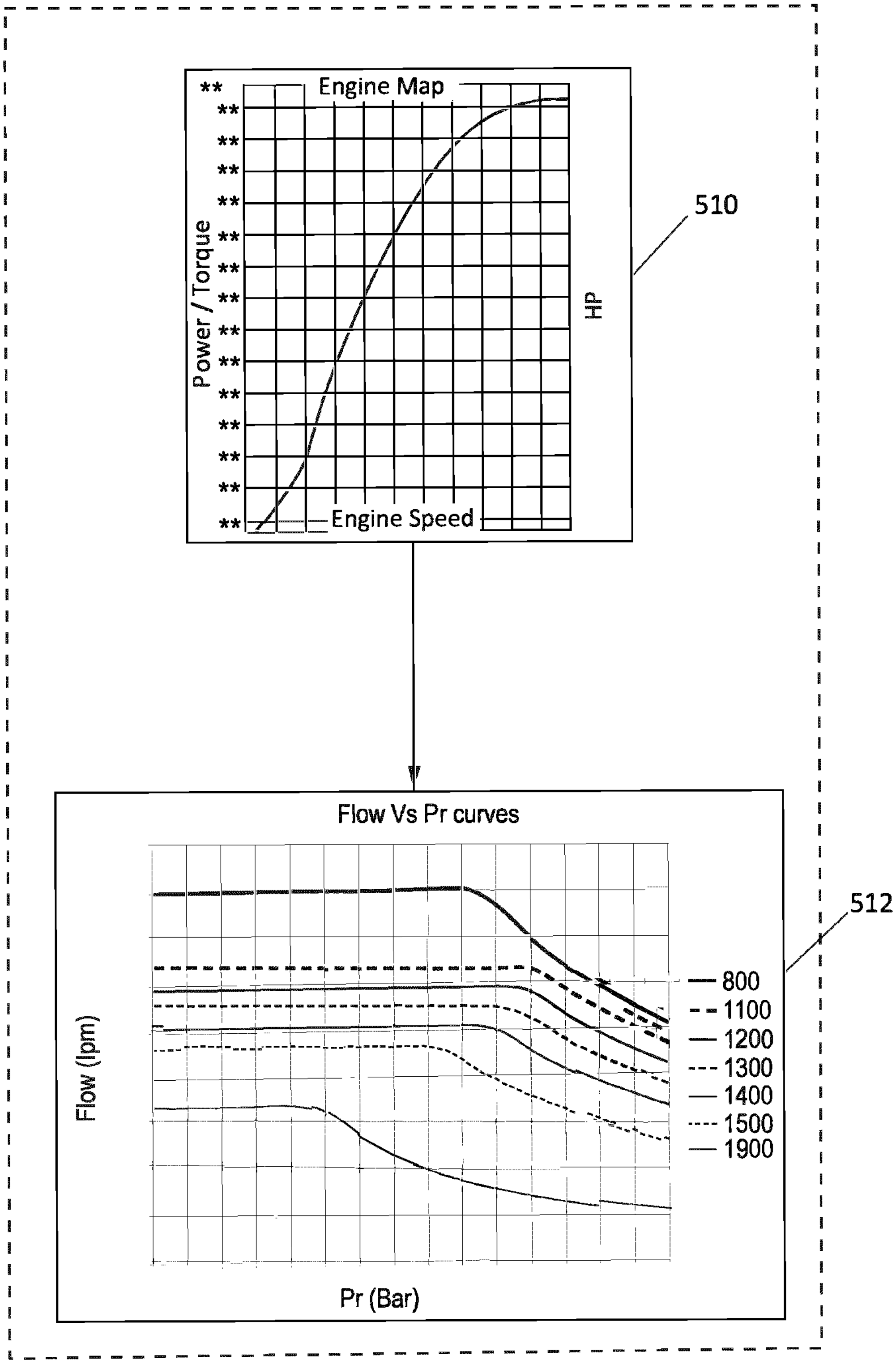
FIG. 3 is a schematic illustration of an example prime mover map and PQ map usable with the hydraulic system controller shown in FIG. 1.
Figure 4:
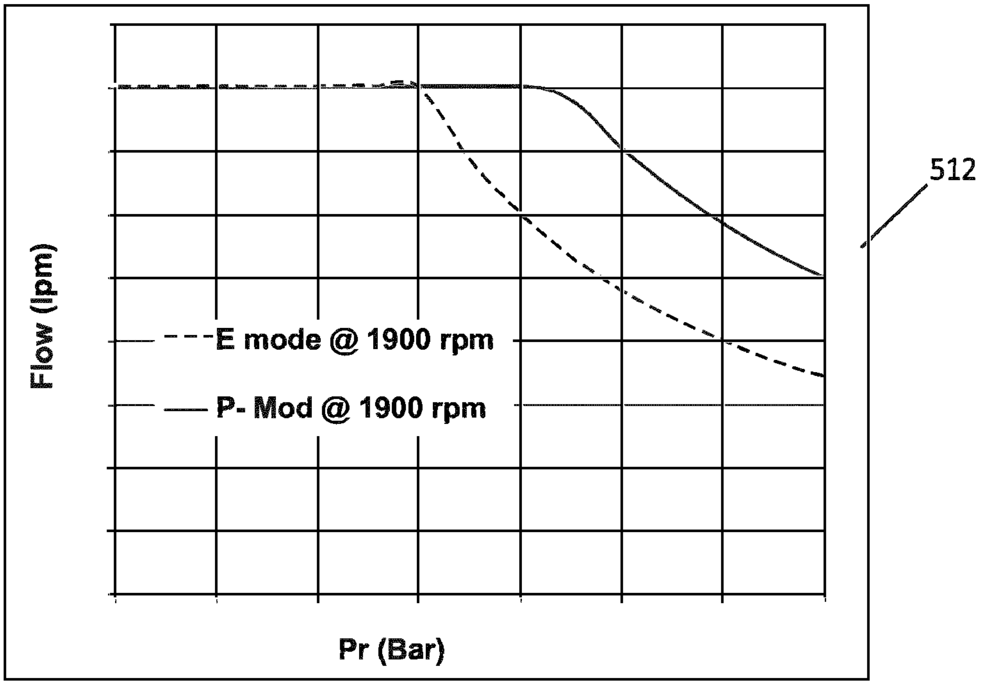
FIG. 4 is a schematic illustration of a portion of a modified PQ map accounting for multiple operating modes of the prime mover of the work machine in FIG. 1.
Figure 5:
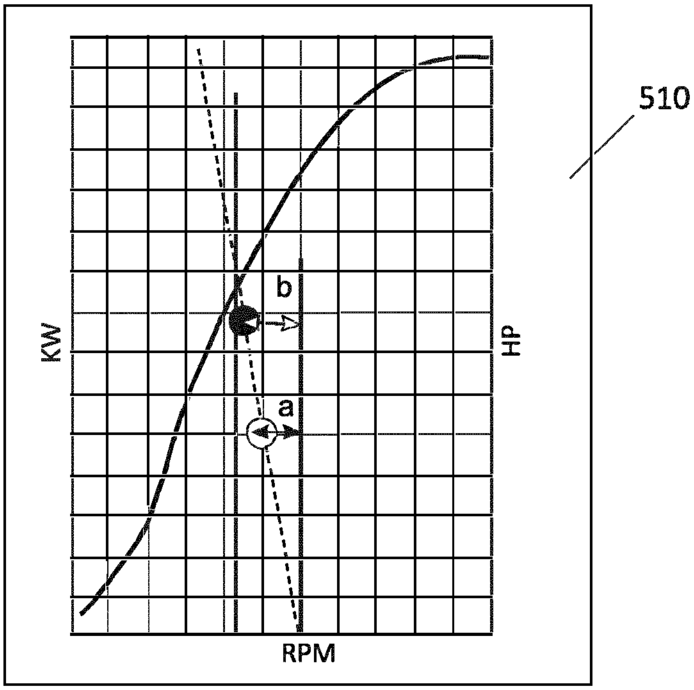
FIG. 5 is a schematic illustration of a prime mover map showing a reduced operating speed of the prime mover of the work machine shown in FIG. 1, when under an operating load.

The controller 504 can also include and/or receive various maps. For example, the controller 504 can store a prime mover curve map 510 correlating power output (e.g. horsepower, watts, etc.) and torque output (e.g., Nm, etc.) with prime mover RPM. As shown at FIG. 3, and as explained in additional detail in a later section, the controller 504 can also generate and/or update additional maps, such as a PQ curve map 512 that can be used to control output to the control valves 104 to prevent prime mover stall. FIG. 4 shows a modified PQ map in which pressure and flow curves are generated for both an economy operating mode of the prime mover and a power mode of the prime mover such that the PQ map can be used for each operating mode of the prime mover. FIG. 5 shows a prime mover curve map 510 wherein a drop in prime mover speed due to loading of the prime mover is depicted and can be used to identify the that the prime mover would stall if not controlled and accordingly reducing the 'max available flow' command in order rather than relying upon a preselected RPM setting.

Figure 2:
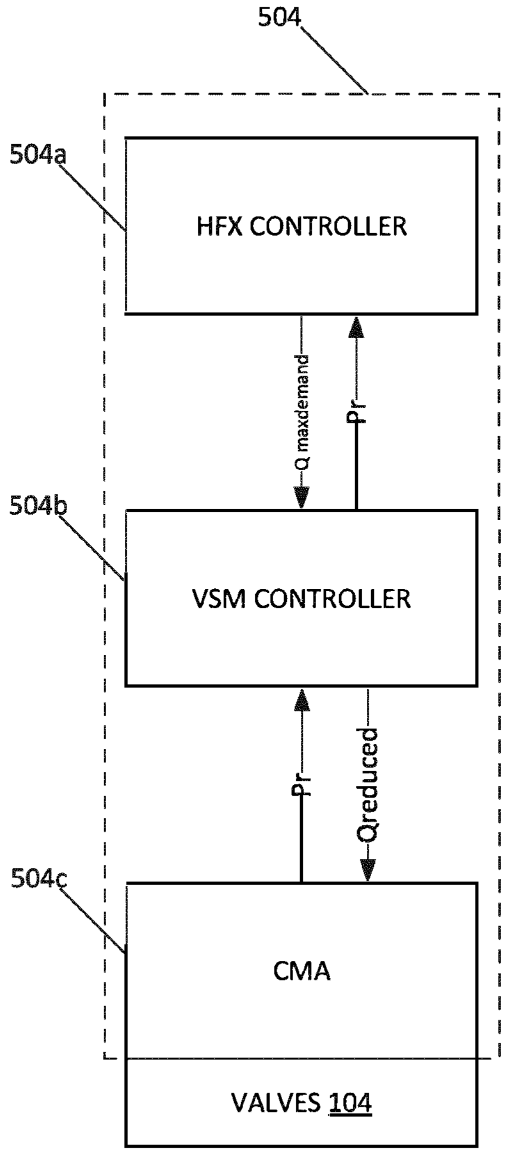
FIG. 2 is a schematic illustration of an example control system usable as the hydraulic system controller in the system shown in FIG. 1.

With reference to FIG. 2, the controller 504 can be configured with a first controller 504*a*, a second controller 504*b*, and a third controller. In the example embodiment presented, the first controller 504*a* is an HFX programmable controller manufactured by Eaton Corporation of Cleveland, Ohio, USA while the second controller 504*b* is an Eaton VSM controller which serves as an interface module for the valves 104 and acts as a CAN gateway, a DC to DC power supply, and a supervisory controller for the hydraulic valve system. FIG. 2 also shows the third controller 504*c* and the valves 104 as being provided in the form of an Eaton CMA valve which includes a CAN-Enabled electrohydraulic sectional mobile valve with independent metering that utilizes pressure and position sensors, on board electronics, and advanced software control algorithms.

System and Operation

Figure 6:
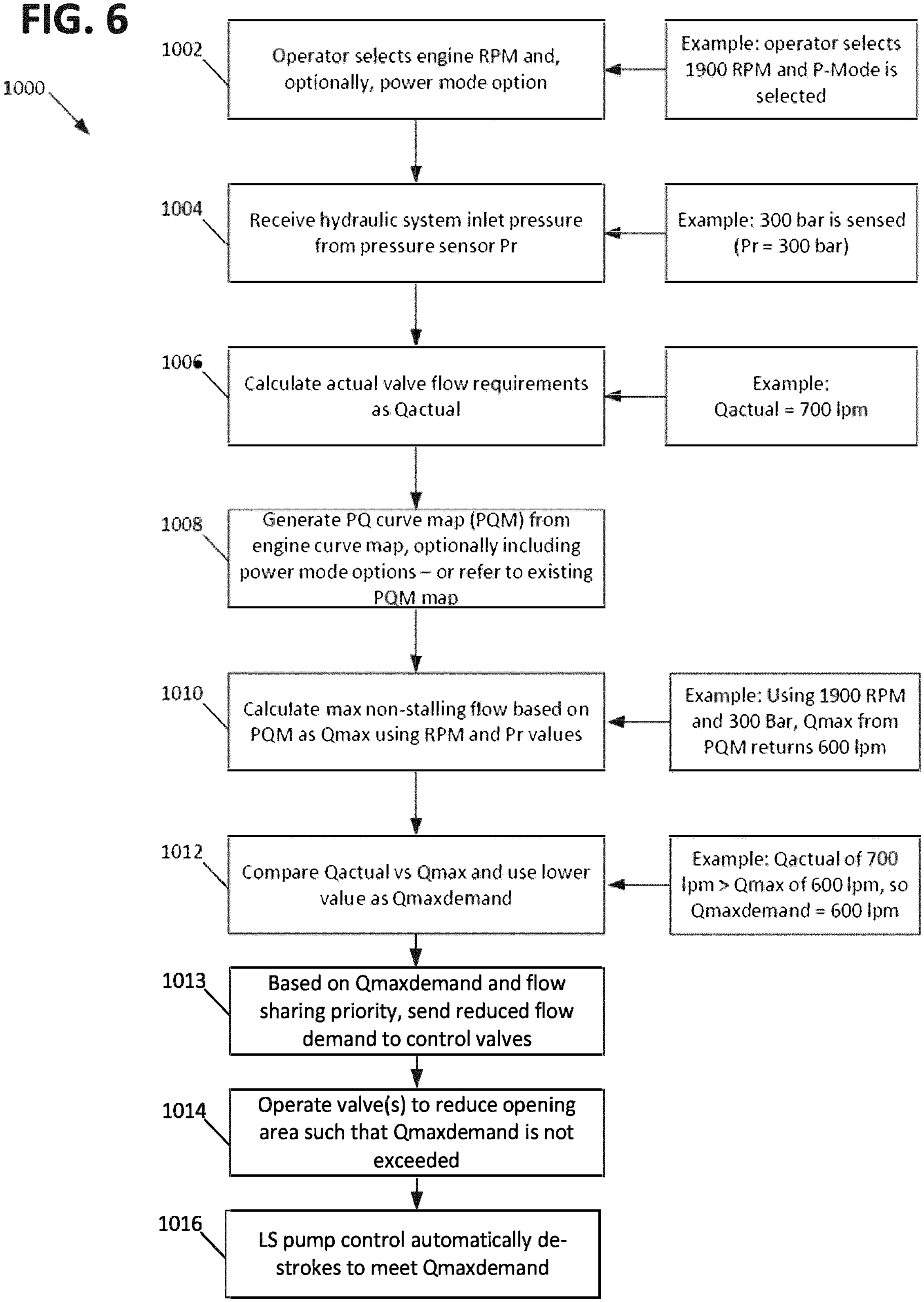
FIG. 6 is a process flow chart showing an example anti-stall flow control operation that can be implemented by the control system shown in FIG. 1.
Figure 7:
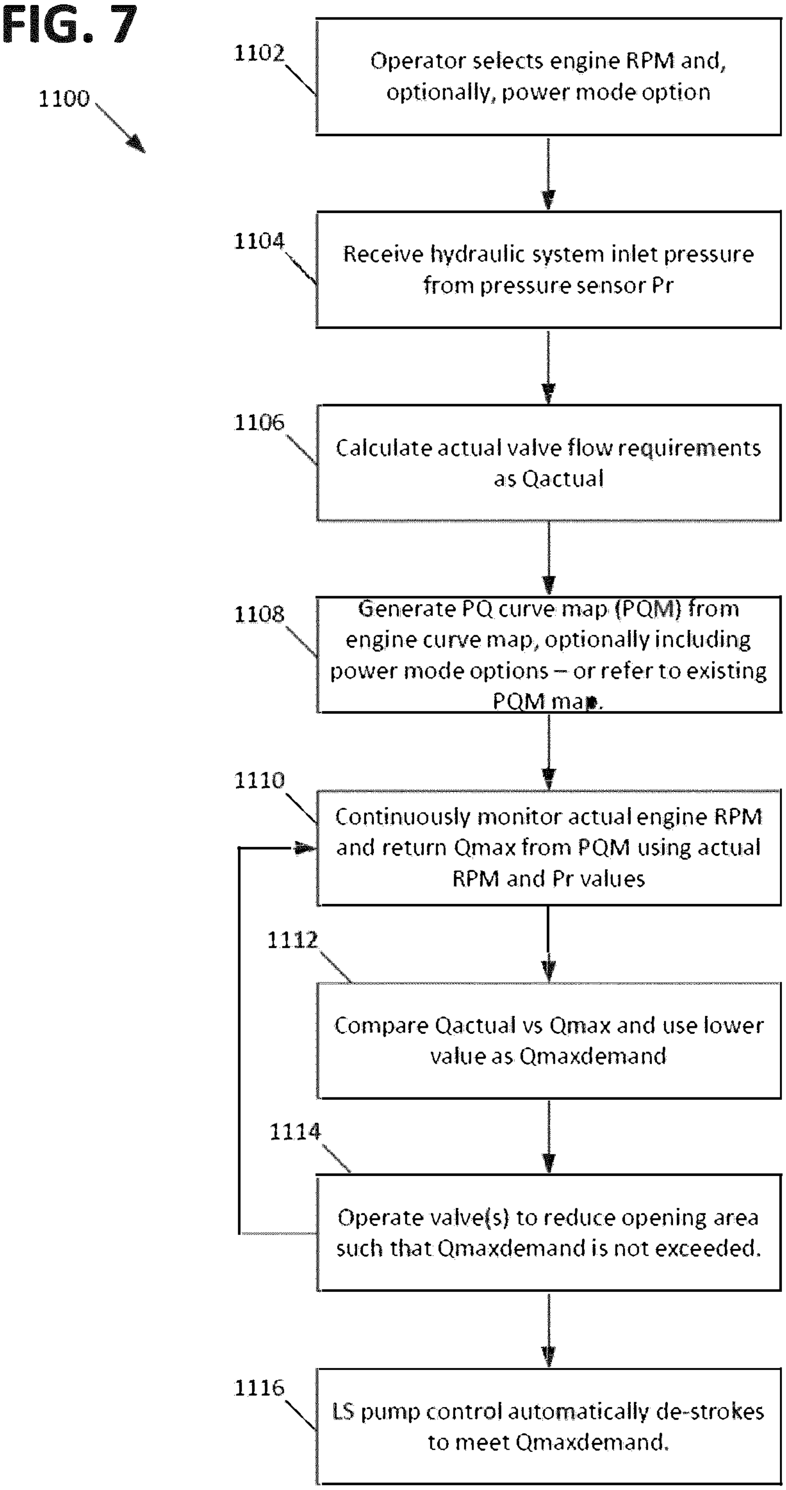
FIG. 7 is a process flow chart showing an example anti-stall flow control operation that can be implemented by the control system shown in FIG. 1.
Figure 8:
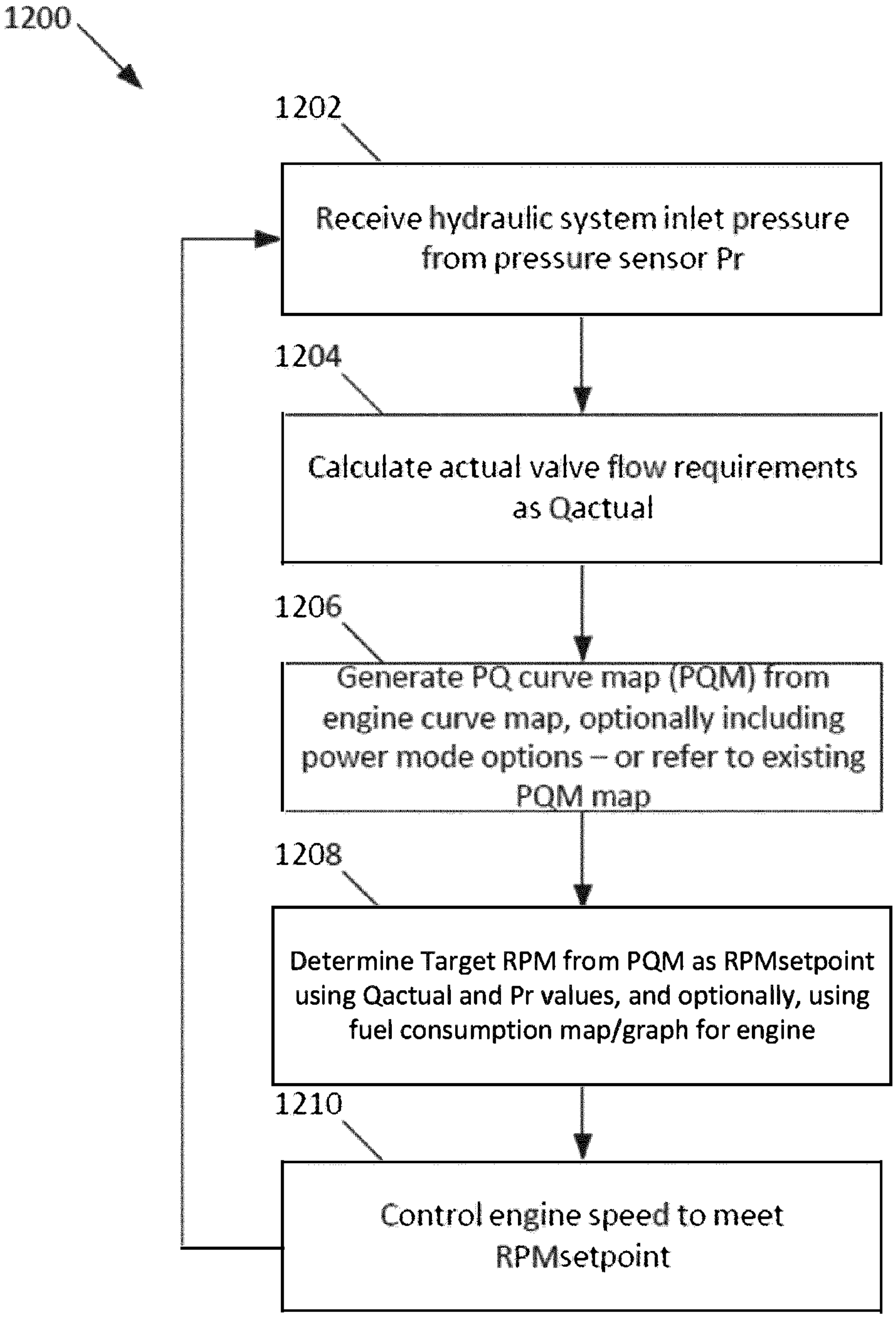
FIG. 8 is a process flow chart showing an example anti-stall prime mover control operation that can be implemented by the control system shown in FIG. 1.

With reference to FIGS. 6 to 8, flow charts are presented showing processes 1000, 1100, 1200 usable with the control system 500 such that stalling of the prime mover is prevented.

FIG. 6 shows a process 1000 with a step 1002 in which the operator of the work machine 10 selects a prime mover speed or RPM setting, and optionally, the operational power mode (e.g. economy mode, power mode). In a step 1004, the control system 500 receives the hydraulic system inlet pressure as Pr from one or more pressure sensors in the hydraulic system. Where an Eaton CMA 504*c* it utilized, the pressure sensors are integrated into the construction. In a step 1006, the actual flow requirement of the hydraulic system 100 is calculated as Qactual by the control system 500, which can be, for example, calculated through joystick inputs. In a step 1008, the PQ curve map 512 is generated from the prime mover curve map 510 such that pressure-flow curves at the selectable prime mover RPM's are established. Step 1008 can also include referencing a pre-established PQ curve map instead of generating such a map. Optionally, the PQ map can include curves for both the economy operational mode and the power operational mode for reference by the system. It is noted that, in some implementations, step 1008 may be performed independently of step 1006. For example, the PQ curve can be generated at the start of the process. In a step 1010, the PQ map is referenced with the selected RPM and pressure Pr to return the maximum non-stalling flow as Qmax. This is the maximum flow that the pump can deliver without stalling the prime mover (i.e. torque/power required at pump shaft is below torque/power that would stall the prime mover per the prime mover curve map). In a step 1012, the Qactual and Qmax flows are compared and the lower value is returned as Qmaxdemand. At a step 1013, the flow sharing block can, based on Qmaxdemand and the flow sharing priority that is preset or otherwise determined for the control valves, send a reduced flow demand to the respective control valves. At a step 1014, the control system 500 operates the valves in accordance with the flow sharing determination such that Qmaxdemand is not exceeded. At a step 1016, the LS pump control will automatically de-stroke to meet the reduced Qmaxdemand value, thereby preventing prime mover stall. As prime mover stall can be prevented with the disclosed process while still using a conventional LS pump control approach, the disclosed approach removes the need to include torque limiters and a displacement controller, as previously discussed.

In one example implementation of the process 1000, an operator selects 1,900 RPM as the prime mover speed and the power mode (P-mode) while the system detects a pressure of 300 bar for Pr and calculates a required flow rate of 700 lpm (liters per minute). From this information, using the PQ map 512, for example the one shown at FIG. 3, a maximum flow value of 600 lpm can be determined as Qmax. In this case, Qmax is less than Qactual and is therefore used as Qmaxdemand with a value of 600 lpm. Consequently, the valves are operated to this reduced maximum flow rate with the LS control automatically de-stroking the pump to lower the power demands on the prime mover to prevent stalling.

FIG. 7 shows a process 1100 that is generally similar to process 1000 with steps 1102 to 1108 that are the same as steps 1002 to 1008. However, in contrast to process 1000, process 1100 continuously or regularly monitors the actual prime mover RPM and references the PQ map with the actual RPM to return an updated Qmax value by looping through steps 1110 to 1114. With such an approach, a more refined anti-stall approach that is more reactive in nature, and can account for conditions when the actual RPM does not equal the RPM setting due to prime mover loading, as illustrated at FIG. 5.

Figure 10:
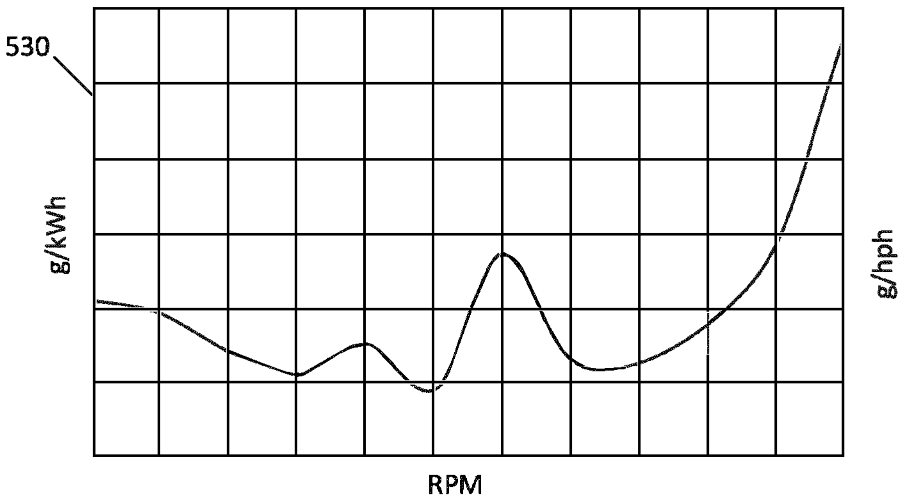
FIG. 10 is a schematic illustration of an example engine fuel consumption map usable with the hydraulic system controller shown in FIG. 1.

FIG. 8 shows a process 1200 in which the prime mover speed is controlled to prevent prime mover stall instead of or in addition to the flow-reduction approach described at FIGS. 6 and 7. For example, process 1200 may also be combined with above approach to prevent the engine from stalling in cases with the required flows may not be met at max engine speeds for example flow of 800 lpm cannot be met at 325 bar pr as max flow available is 600 lpm at max speed, so in this case the engine operates at max speed and engine stall ensures the engine does not stall. In process 1200, the pressure Pr is received at step 1202 while the actual flow requirements are calculated as Qactual. In a step 1206, the PQ map is referenced with these variables to identify the target RPM setpoint that will satisfy the flow and pressure requirements of the hydraulic system. At step 120, the target RPM is determined from the PQ curve map (PQM) as RPMsetpoint using Qactual and Pr values. Optionally, a fuel consumption map or graph for the engine can also be referenced at step 1208 for this determination. An example fuel consumption map or graph 530 is shown at FIG. 10 showing fuel consumption as gallons per horsepower hour and gallons per kilowatt hour as a function of engine speed (RPM). The prime mover speed is then controlled to meet the RPM setpoint at step 1210. As depicted, this process can be continuously or regularly looped such that the prime mover speed can be varied to ensure that the actual flow and pressure conditions can be satisfied along with point of reduced fuel consumption while preventing prime mover stall.

Figure 9:
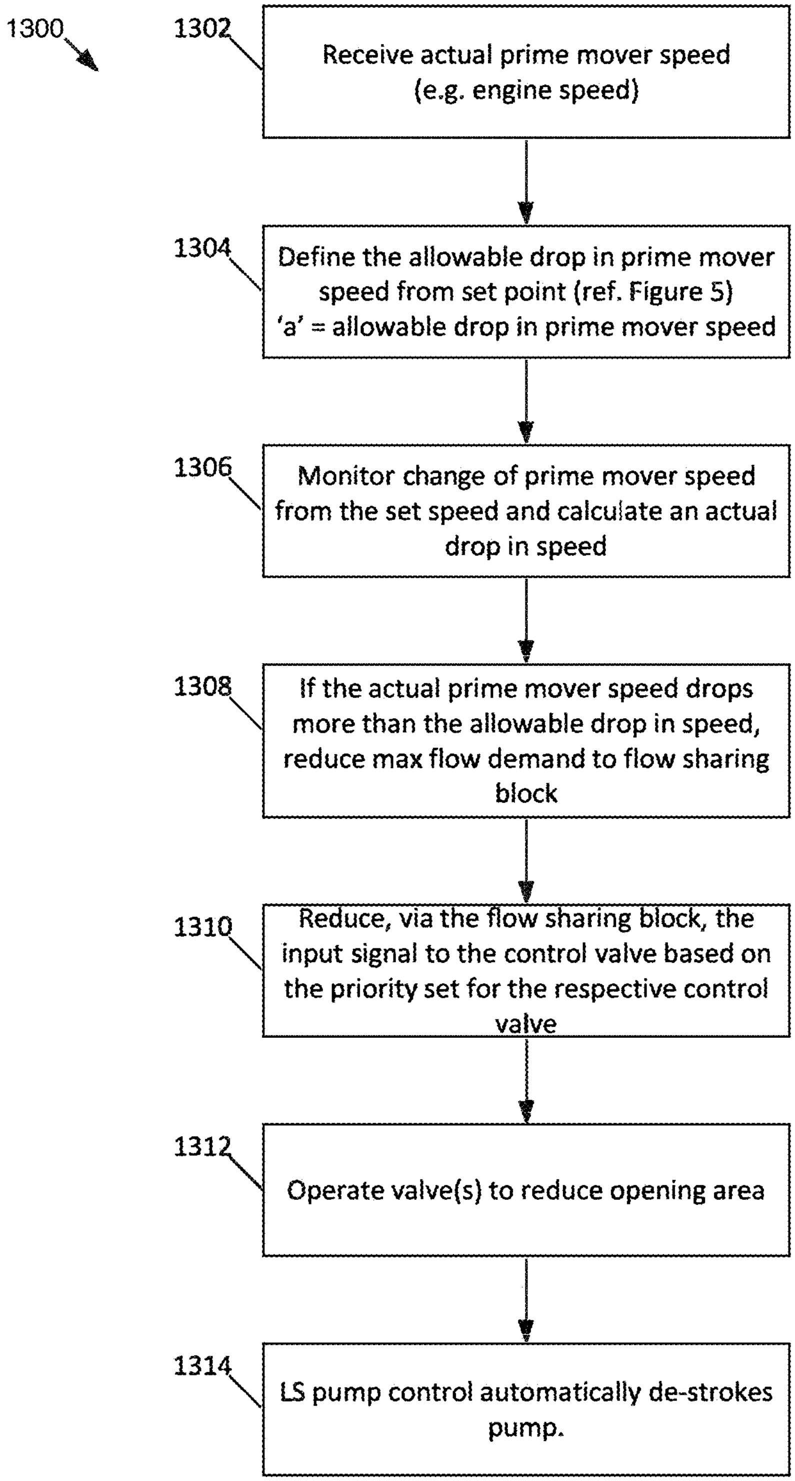
FIG. 9 is a process flow chart showing an example anti-stall flow control operation that can be implemented by the control system shown in FIG. 1.

FIG. 9 shows a process 1300 in flow reduction to the valves is effectuated based on monitoring changes in the speed of the prime mover, as illustrated at FIG. 5. In a step 1302, an actual speed (e.g. RPM) of the prime mover is received. In a step 1302, an allowable drop in prime mover speed from a set point or command is defined or otherwise referenced by the system. For example, the allowable drop can be a function of a predefined parameter such as a percentage of the prime mover speed. The allowable drop in speed can also be a fixed speed value. Accordingly, step 1304 can include calculating the allowable drop in prime mover speed by multiplying the actual prime mover speed by the predetermined parameter. In a step 1306, the change between the actual speed of the prime mover and the set point speed is monitored and an actual drop in prime mover speed is calculated. In a step 1308, the actual drop in speed is compared to the allowable drop in speed and, if the actual prime mover speed drops more than the allowable drop in speed, the max flow demand for the valves is proportionally reduced to the flow sharing block. In a step 1310, the flow sharing block reduces the input signals to the control valves based on the priority set for each respective control valve, as previously described. In a step 1312, the valves are operated to reduce the opening area in accordance with the flow sharing block determination causing the LS pump control to automatically de-stroke at step 1314.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for preventing prime mover stall for a work machine including a hydraulic system having a plurality of control valves served by a hydraulic pump, the method comprising:

determining, at a controller, an actual required flow rate value for the plurality control valves;

determining, at the controller, a total maximum flow rate to the plurality of control valves that will enable the prime mover to operate without stalling; and operating the plurality of control valves, with the controller, such that a combined total flow of the plurality control valves is at or below the total maximum flow rate such that the pump operates at a condition below which prime mover stall will occur;

wherein the step of determining the total maximum flow rate includes referencing a first map correlating prime mover speed with prime mover torque and further includes generating a second map correlating pump flow with pressure at one or more prime mover speeds based on the first map.

2. The method of claim 1, further comprising:

setting, at the controller, a maximum flow or setting for each of the plurality of control valves based on flow sharing criteria such that a total sum of control valve flow rates is equal to or less than the total maximum flow rate; and operating each of the plurality of control valves, with the controller, at or below the total maximum flow rate based on the flow sharing criteria associated with each control valve.

3. The method of claim 1, wherein the determining step includes returning a pump flow value from the second map based on a sensed hydraulic system pressure and an actual prime mover speed.

4. The method of claim 3, wherein the determining step further includes using a joystick input to determine the pump flow value.

5. The method of claim 1, wherein the pump is operated without a torque limiter.

6. A method for preventing prime mover stall for a work machine including a hydraulic system, the method comprising:

receiving, at a control system, a prime mover speed requirement and a hydraulic system inlet pressure value associated with one or more control valves of the hydraulic circuit;

calculating, at the control system, an actual required flow rate value of the hydraulic circuit;

referencing a map, with the control system, using the prime mover speed setting, the actual required flow rate, and the inlet pressure value to return a maximum flow rate setting;

continuously or repeatedly monitoring an actual prime mover speed and updating the maximum flow rate setting based on the actual prime mover speed;

operating the one or more control valves, with the control system, such that the lesser of the actual required flow rate and the maximum flow rate setting is not exceeded; and controlling a pump of the hydraulic system with a load-sense control to de-stroke the pump to meet the maximum flow rate setting to prevent stalling of the prime mover.

7. The method of claim 6, wherein the map includes multiple curves for different prime mover speed settings.

8. The method of claim 6, wherein the map is generated by the control system from a prime mover curve map.

9. The method of claim 6, wherein the map includes curves for a power mode operational setting of the prime mover and for an economy mode operational setting of the prime mover.

10. The method of claim 6, wherein the step of operating the one or more control valves includes reducing an opening area of the one or more valves such that the lesser of the actual required flow rate and the maximum flow rate setting is not exceeded to prevent stalling of the prime mover.

11. The method of claim 6, further including the step of defining a maximum flow demand setting by selecting the lower of the actual required flow rate and the maximum flow rate setting, wherein the step of operating the one or more control valves includes operating the one or more valves to not exceed the maximum flow demand setting.

12. The method of claim 6, wherein the pump is operated without a torque limiter.

* * * * *